Figure 1:
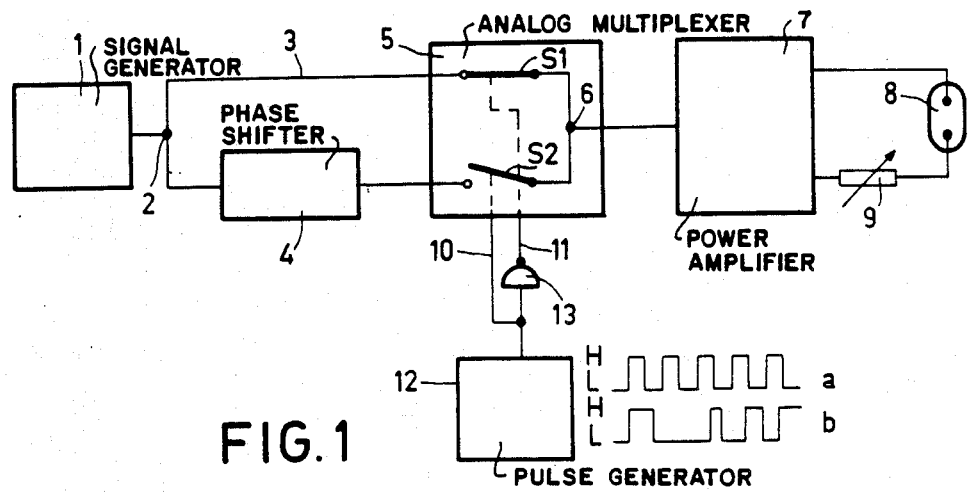

United States Patent [19]
Ganser et al.

[11] Patent Number: 4,705,991
[45] Date of Patent: Nov. 10, 1987

[54] METHOD OF OPERATING A HIGH-PRESSURE METAL VAPOR DISCHARGE LAMP AND CIRCUIT ARRANGEMENT FOR CARRYING OUT THIS METHOD

[75] Inventors: Hans G. Ganser, Stolberg; Reinhard Kersten; Rolf Schäfer, both of Aachen; Hans P. Stormberg, Stolberg, all of Fed. Rep. of Germany

[73] Assignee: U.S. Philips Corporation, New York, N.Y.

[21] Appl. No.: 382,735

[22] Filed: May 27, 1982

[30] Foreign Application Priority Data

Jun. 4, 1981 [DE] Fed. Rep. of Germany ....... 3122183
Jan. 27, 1982 [DE] Fed. Rep. of Germany ....... 3202499

[51] Int. Cl.$^4$ ............................................. H05B 37/02
[52] U.S. Cl. .............................. 315/209 R; 315/194; 315/199; 315/287
[58] Field of Search .................... 315/247, 287, 209 R

[56] References Cited

U.S. PATENT DOCUMENTS

| | | | |
|---|---|---|---|
| 3,463,964 | 8/1969 | Privett et al. | 315/247 |
| 3,621,331 | 11/1971 | Barron | 315/DIG. 2 |
| 3,890,537 | 6/1975 | Park et al. | 315/247 |
| 3,999,100 | 12/1976 | Dencly et al. | 315/287 |
| 4,066,930 | 1/1978 | Summa | 315/DIG. 2 |
| 4,170,747 | 10/1979 | Holmes | 315/287 |
| 4,187,448 | 2/1980 | Kuroi et al. | 315/DIG. 2 |
| 4,375,608 | 3/1983 | Kohler | 315/307 |

Primary Examiner—Harold Dixon
Attorney, Agent, or Firm—Robert T. Mayer; Bernard Franzblau

[57] ABSTRACT

A method of operating a high-pressure metal vapor discharge lamp at a periodic operating voltage of more than 500 Hz wherein the operating voltage is suddenly varied in phase at intervals, and preferably also wobbled in frequency, in order to avoid acoustic resonances in the lamp.

18 Claims, 5 Drawing Figures

METHOD OF OPERATING A HIGH-PRESSURE METAL VAPOR DISCHARGE LAMP AND CIRCUIT ARRANGEMENT FOR CARRYING OUT THIS METHOD

This invention relates to a method of operating a high-pressure metal vapour discharge lamp at a periodic operating voltage of more than 500 Hz. A periodic operating voltage is, for example, to be understood to mean a sinusiodal, triangular or rectangular voltage.

In the operation of high-pressure metal vapour discharge lamps, such as high-pressure sodium vapour discharge lamps, mercury vapour discharge lamps and--metal--halide discharge lamps, above the AC line frequency, arc instabilities occur in the lamps in given frequency ranges. These instabilities are caused by acoustic resonance of the discharge arc in the discharge tube of the lamp. In some lamp types, arc instabilities occur in very wide frequency ranges of the operating voltage. Therefore, it has been assumed so far that a stable operation of these lamps is possible only in relatively narrow frequency bands. Frequency bands—of a width from 3 to 5 kHz—free from instabilities between 20 and 50 kHz for miniature metal vapour discharge lamps have been described, for example, in U.S. Pat. No. 4,170,746.

Moreover it is known from DE-OS No. 2,335,589 to modulate the high-frequency supply voltage (20 kHz, for example) with a low-frequency signal in order to avoid acoustic resonances causing arc instabilities in low-pressure and high-pressure mercury vapour discharge lamps. However, in the last mentioned DE-OS it is admitted that even a high degree of frequency modulation is not sufficient to suppress resonance effects completely.

According to the U.S. Pat. No. 3,890,537 acoustic resonances in mercury vapour discharge lamps operated with a pulsatory current are avoided in that the chopper frequency is wobbled automatically. There are resonance frequencies, however, at which wobbling of the chopper frequency fails.

In particular in small high-pressure metal vapour discharge lamps, it has been found that wobbling of the operating voltage alone has practically no effect.

Therefore, an object of the invention is to provide a method of operating high-pressure metal vapour discharge lamps above 500 Hz in which practically no acoustic resonances and arc instabilities caused thereby occur in the lamps over a very large frequency range of, for example, 500 Hz to 200 kHz.

In a method of the kind mentioned in the preamble, this is achieved according to the invention in that the operating voltage is constantly subjected to sudden phase variations.

The constant phase variations disturb the excitation of acoustic resonances, which cause the arc instabilities.

Preferably, the operating voltage is subjected to phase jumps in the order of 50° to 130°, in particular of 90°.

The phase variation may take place periodically. However, side bands then occur in the frequency spectrum of the operating voltage, which may in turn lead to instabilities. The amplitude of these side bands may be reduced, however, in that the phase variation is effected statistically, i.e. at irregular distances. For excitation, instabilities require a given threshold value. Stastistic phase variation causes them to fall below this threshold value.

Preferably the phase variation takes place after each ½ to 20 periods of the operating voltage.

As has been stated above, with periodic phase variations, frequency bands with arc instabilities can occur, in particular in miniature metal halide discharge lamps, in the frequency range of the operating voltage, which is free from instabilities with statistic phase variation.

In an advantageous further embodiment of the method according to the invention of operating small high-pressure metal vapour discharge lamps for frequencies of more than 5 kHz, in which the periodic operating voltage is subjected periodically to sudden phase variations and yet in a large frequency range of, for example, 20 to 60 kHz practically no acoustic resonances and arc instabilities caused thereby occur in the lamps, if the operating voltage is wobbled in frequency at the same time.

Surprisingly it has been found that due to wobbling of the operating voltage frequency, which has per se substantially no effect with simultaneous periodic phase variations, the frequency range free from acoustic instabilities as compared with the stability range with a periodic phase variation alone is enlarged.

The expression "small high-pressure metal vapour discharge lamps" is to be understood to mean lamps having a discharge tube volume of up to at the most 2 cm$^3$.

In a preferred further embodiment of the method according to the invention, the operating voltage comprises a direct voltage component. The resultant pulsatory direct current operation can be achieved by an electronic ballast unit more simply than with a pure alternating current operation. In small lamps, in particular miniature metal halide discharge lamps, a pulsatory direct current operation does not give rise to problems because in this case, in contrast with high-pressure discharge lamps having a large electrode distance, the axial demixing of the substances by cataphoresis substantially does not play a part.

In the case of the pulsatory direct current operation, the operating voltage can exhibit phase jumps of 100° to 250°, preferably 180°.

The invention further relates to a circuit arrangement for carrying out the method described. This circuit arrangement according to the invention is characterized in that a periodic signal of a signal generator is supplied on the one hand directly and on the other hand through a phase shifter to an analogue multiplexer and then through a power amplifier to the high-pressure metal vapour discharge lamp as the operating voltage, the analogue multiplexer connecting by means of a digital pulse generator either periodically or statistically alternately directly or through the phase shifter the signal generator to the power amplifier.

With a simultaneous wobbling of the operating voltage, this circuit arrangement is preferably characterized in that the analogue multiplexer connects periodically the signal generator to the power amplifier and the signal generator is controlled by a voltage generator of constant amplitude ($U_w$) and frequency ($f_w$) so that its output signal is varied in frequency about a central frequency $f_o$ with a frequency sweep of $\pm \Delta f$.

In order to superimpose a direct voltage on the operating voltage, according to a further embodiment of the circuit arrangement in accordance with the invention, a direct voltage source is connected between the power amplifier and the lamp.

Figure 2:
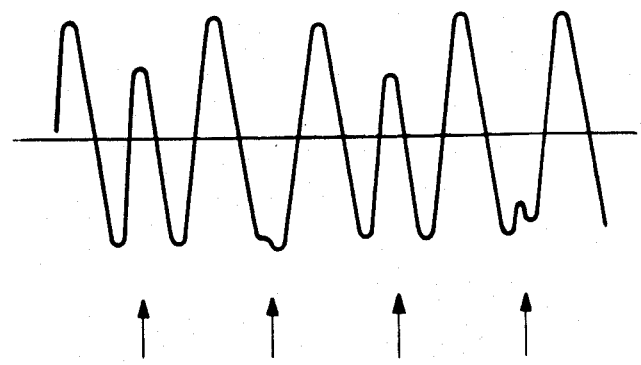
Figure 3:
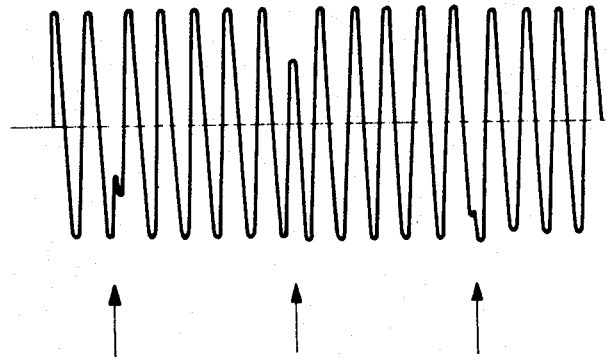
Figure 4:
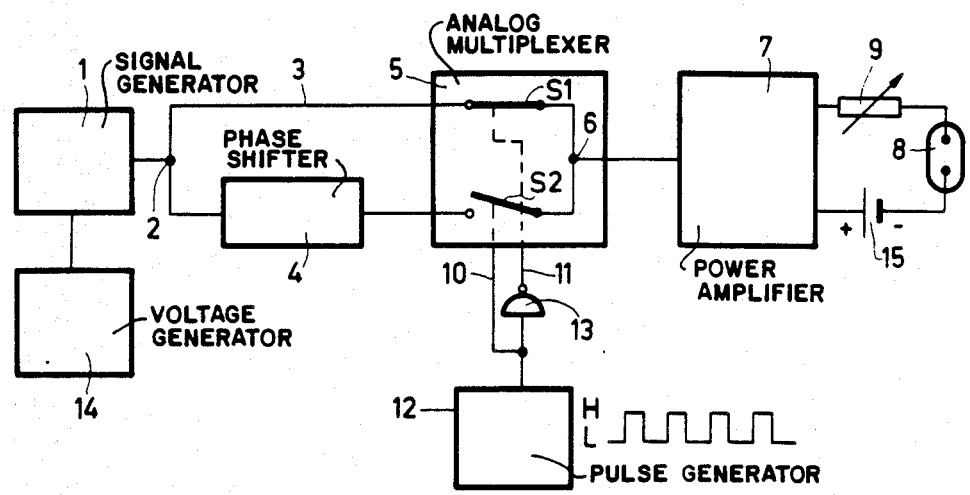
Figure 5:
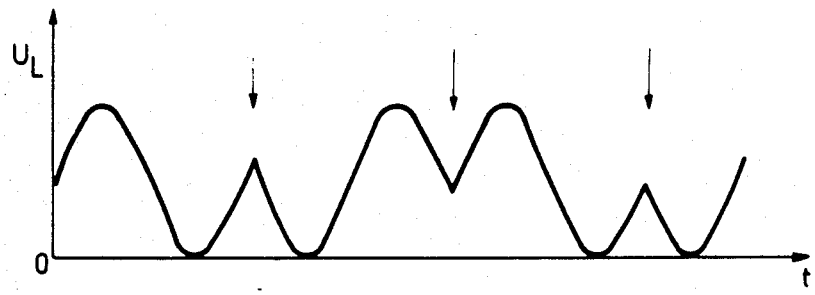

Two embodiments of the invention will now be described with reference to the accompanying drawing, in which:

FIG. 1 shows a block circuit diagram of a circuit arrangement for operating a high-pressure metal vapour discharge lamp, FIG. 2 illustrates the variation of the lamp voltage in the case of a phase jump of 90° after each about 1.5 periods of the sinusoidal operating voltage, FIG. 3 shows a voltage variation according to FIG. 2 with phase jumps of 90° after each 5.5 periods of the sinusoidal operating voltage, FIG. 4 shows a block diagram of another circuit arrangement for operating a small high-pressure metal vapour discharge lamp, and FIG. 5 shows the variation of the lamp voltage in the case of a pulsatory direct current operation.

In the circuit arrangement of FIG. 1, a signal generator 1 produces a sinusoidal output voltage of constant frequency f, which from the junction 2 is supplied on the one hand through a lead 3 directly and on the other hand through a phase shifter 4 to an analogue multiplexer 5. The output 6 of the analogue multiplexer 5 is connected to a linear power amplifier 7, to which is connected the series combination of a high-pressure metal vapour discharge lamp 8 and a ballast impedance 9.

The analogue multiplexer 5 acts as a switch having two switching contacts S1 and S2. Through leads 10 and 11 the analogue multiplexer 5 is controlled by a digital pulse generator 12. An inverter 13 is inserted into the lead 11. When the output of the digital pulse generator 12 is switched to a LOW signal (L), L also is present at the lead 10, whereas the lead 11 is switched through the inverter 13 to a HIGH signal (H). In this condition the analogue multiplexer 5 closes its switch S1, so that the voltage of the signal generator 1 is directly applied to the output 6. When the output of the digital pulse generator 12 is switched to H, H is also present at the lead 10, whereas the lead 11 is set to L through the inverter 13. In this condition the switch S2 of the analogue multiplexer 5 is closed so that the phase-shifted voltage of the signal generator 1 is applied to its output 6. The phase variation of the output voltage of the analogue multiplexer 5 with respect to the output voltage of the signal generator 1 may be effected by means of the phase shifter 4 by phase jumps of 50° to 130°, preferably of 90°. The desired phase variation may be adjusted in the phase shifter 4.

When the digital pulse generator 12 supplies a periodic pulse sequence (a), the voltage via lead 3 or the voltage subjected to phase variation of the signal generator 1 alternately appears at the output 6 of the analogue multiplexer 5. The frequency of the phase variation of the output voltage of the analogue multiplexer 5 is given by the fundamental frequency $f_p$ of the periodic pulse sequence (a) of the digital pulse genertor 12. A phase variation at the output 6 of the analogue multiplexer 5 thus occurs each time after $f/f_p$ periods of the signal generator voltage so that the time sequence of the phase variations can be adjusted by choice of this ratio. When the H/L change-over of the digital pulse generator 12 takes place irregularly, i.e. statistically distributed (pulse sequency b), a likewise irregular phase variation of the voltage at the output 6 of the analogue multiplexer 5 is obtained.

The output voltage of the analogue multiplexer 5 thus obtained, which is subjected to periodic or statistic phase variations in the form of phase jumps is then supplied to the lamp 8 as an operating voltage through the linear power amplifier 7.

In a practical embodiment, the lamp 8 was a 300 W-mercury high-pressure discharge lamp. The signal generator 1 produced a voltage of about 3 kHz. This frequency lies in an instability range of the lamp concerned. FIGS. 2 and 3 show the variations in time of the lamp voltage in case of a 90° phase jump after each 1.5 respectively 5.5 periods of the sinusoidal output voltage of the signal generator 1. (The separate phase jumps are characterized by small arrows below the voltage variations). By these phase variations a stable operation of the lamp can be achieved. Also with phase jumps of more or less than 90°, for example, between 50° and 130°, arc instabilities in the lamp can be avoided.

In the circuit arrangement of FIG. 4, as compared with the circuit arrangement of FIG. 1, an additional voltage generator 14 is provided which produces a periodic, for example sinusoidal, voltage having an amplitude $U_w$ and a frequency $f_w$. This is the input of the voltage controlled signal generator 1. The latter in turn produces a periodic, in the present case sinusoidal, output voltage, the frequency of which is varied about an adjustable central frequency $f_o$ with the wobble frequency $f_w$ between $f_o - \Delta f$ and $f_o + \Delta f$, the frequency sweep $\Delta f$ being determined by the amplitude $U_w$ of the wobble voltage. This output voltage of the signal generator 1, which is permanently varied in frequency, is then applied from the junction 2 on the one hand directly through the lead 3 and on the other hand through the phase shifter 4 to the analogue multiplexer 5. The output 6 of the analogue multiplexer 5 is again connected to the linear power amplifier 7, to which the series-combination of a small high-pressure metal vapour discharge lamp 8, the ballast impedance 9 and a direct voltage source 15 is connected.

When the switch S2 of the analogue multiplexer 5 is closed, the phase-shifted and wobbled voltage of the signal generator 1 is applied to the output 6. Since the digital pulse generator 12 supplies a periodic pulse sequence, alternately the directly wobbled voltage or the wobbled voltage varied in phase of the signal generator 1 occurs at the output 6 of the analogue multiplexer. The frequency of the phase variation of the output voltage of the analogue multiplexer 5 is given by the fundamental frequency $f_p$ of the periodic pulse sequence of the digital pulse generator 12. A phase variation at the output 6 of the analogue multiplexer 5 thus occurs each time after approximately $f_o/f_p$ periods of the signal generator voltage so that by the choice of this ratio the time sequence of the phase variations can be adjusted. The output voltage of the analogue multiplexer 5 with periodic phase variations in the form of phase jumps thus obtained is then applied through the linear power amplifier 7 to the lamp 8 as the operating voltage.

In the circuit arrangement of FIG. 4, an additional direct voltage source 15 (for example, 100 V) is connected between the power amplifier 7 and the lamp 8. As a result, the lamp 8 is operated with a direct current on which the operating alternating current supplied by the power amplifier 7 is superimposed. In the case of pulsatory direct current operation, the frequencies of the voltage modulation and of the power modulation correspond to each other. In order to attain a phase jump in power of 180°, the phase jump of the operating voltage therefore also has to be 180°, in contrast with 90° with a pure alternating voltage operation of the lamp. The admissible range for the phase jumps amounts to approximately 100° to 250°.

In a practical embodiment, the lamp 8 was an elliptical 45 W metal halide high-pressure discharge lamp having a bulb diameter of approximately 7 mm and a bulb volume of approximately 0.5 cm$^3$. The voltage-controlled signal generator 1 produced a voltage with a central frequency $f_o$ in the frequency range of from 20 to 50 kHz. The frequency sweep $\Delta f$ amounted to 500 Hz to 15 kHz and preferably 5 kHz. The wobble frequency $f_w$ of the voltage generator 14 was between 30 Hz and 15 kHz and preferably 100 Hz.

FIG. 5 shows the variation as a function of time of the lamp voltage $U_L$ in the case of a phase jump of 180° of the wobbled sinusoidal output voltage of the signal generator 1 (the separate phase jumps are indicated by arrows above the voltage variation). The voltage variation may also be such that it does not touch the zero line. With the voltage variation shown, a frequency band free from instabilities of approximately 25 kHz in width was obtained. On the contrary, the frequency band free from instabilities with operation of the lamp at a pure sinusoidal operating voltage was only approximately 3 kHz.

The wide stability frequency band permits of obtaining high tolerances when fixing the frequencies of the electronic ballast units and also when maintaining the lamp dimensions.

With the use of the method in electronic high-frequency ballast units, in the circuit arrangement according to FIGS. 1 or 4, the circuit part composed of the power amplifier 7, the ballast impedance 9 and, as the case may be, the direct voltage source 15 is replaced by the power electronics of the corresponding ballast unit, which is then controlled by the output signal of the analogue multiplexer 5.

With the method described above, not only longitudinal, but also azimuthal and radial acoustic resonances are avoided in high-pressure metal vapour discharge lamps.

The lamps need not comprise a cylindrical envelope, but may alternatively have, for example, a spherical or ellipsoidal form.

What is claimed is:

1. A method of operating a high-pressure metal vapour discharge lamp at a frequency above 500 Hz comprising: producing a periodic lamp operating voltage with a frequency greater than 500 Hz, and suddenly varying the phase of said lamp operating voltage at given time intervals so as to minimize the occurrence of acoustic resonance effects in a high-pressure metal vapour discharge lamp.

2. A method as claimed in claim 1 wherein the operating voltage exhibits phase jumps in the range of 50° to 130°.

3. A method as claimed in claims 1 or 2, characterized in that the phase variation is effected periodically or statistically.

4. A method as claimed in claim 3, characterized in that the phase variation time intervals occur after each ½ to 20 periods of the operating voltage.

5. A method as claimed in claim 1 for the operation of small high-pressure metal vapour discharge lamps wherein the operating voltage is periodically suddenly varied in phase and has a frequency of more than 5 kHz, and further comprising the step of wobbling the frequency of the operating voltage at the same time.

6. A method as claimed in claim 5, characterized in that the operating voltage comprises a direct voltage component.

7. A method as claimed in claim 6, characterized in that the operating voltage exhibits phase jumps in the range of 100° to 250°.

8. A method as claimed in claim 6 wherein the operating voltage is made to exhibit abrupt variations in phase of 180° at said given time intervals.

9. A method as claimed in claim 1 wherein the operating voltage is made to exhibit abrupt variations in phase of 90° at said given time intervals.

10. A method as claimed in claim 1 wherein said given time intervals occur periodically and independently of the lamp current.

11. A method as claimed in claim 1 wherein said given time intervals occur in a non-periodic manner.

12. A circuit for operating a high-pressure metal vapour discharge lamp with a periodic operating voltage at a frequency above 500 Hz comprising: a signal generator for producing a periodic voltage at a frequency above 500 Hz, means for directly supplying a first voltage component of said periodic voltage to an input of an analog multiplexer, a phase shifter coupled between the signal generator and the input of the analog multiplexer for supplying to the input of the analog multiplexer a second voltage component of said periodic voltage which is shifted in phase relative to the first voltage component, a power amplifier for coupling an output of the analog multiplexer to output terminals for supplying the operating voltage to said discharge lamp, and a pulse generator coupled to a control input of the analog multiplexer for switching the analog multiplexer so that said first and second voltage components alternately appear at the output of the analog multiplexer and are coupled via said power amplifier to said output terminals as a lamp operating voltage exhibiting sudden variations in phase at given time intervals.

13. A circuit as claimed in claim 12 wherein the pulse generator periodically switches the analog multiplexer, and a voltage generator coupled to the signal generator, said voltage generator supplying a voltage having a constant amplitude ($U_W$) and a frequency ($f_W$) such that the output voltage of the signal generator is varied in frequency about a central frequency ($f_O$) with a frequency sweep of $\pm \Delta f$.

14. A circuit as claimed in claim 13 further comprising a direct voltage source connected between the output of the power amplifier and one of said output terminals.

15. A circuit as claimed in claim 12 wherein said pulse generator includes means for deriving switching pulses for the analog multiplexer that occur in a periodic manner so that said given time intervals are also periodic.

16. A circuit as claimed in claim 12 wherein said pulse generator includes means for deriving switching pulses for the analog multiplexer that occur in a non-periodic manner so that said given time intervals are also non-periodic.

17. A circuit as claimed in claim 12 further comprising means coupled to said signal generator for controlling the signal generator to produce an output voltage that varies in frequency about a central frequency ($f_O$).

18. A method of operating a high pressure metal vapor discharge lamp at a frequency above 500 Hz comprising: producing an alternating periodic operating voltage for the lamp at a frequency greater than 500 Hz having a regular phase sequence, and suddenly changing the phase sequence of said lamp alternating operating voltage at given time intervals so as to reduce the occurrence of acoustic resonance effects in a high pressure metal vapor discharge lamp.

* * * * *